(12) United States Patent
Nakanishi (10) Patent No.: US 9,150,094 B2
(45) Date of Patent: Oct. 6, 2015

(54) RADIATOR CORE SUPPORT

(71) Applicant: Makoto Nakanishi, Toyota (JP)

(72) Inventor: Makoto Nakanishi, Toyota (JP)

(73) Assignee: Toyoda Iron Works Co., Ltd., Toyota-shi (JP)

( * ) Notice: Subject to any disclaimer, the term of this patent is extended or adjusted under 35 U.S.C. 154(b) by 0 days.

(21) Appl. No.: 14/282,718

(22) Filed: May 20, 2014

(65) Prior Publication Data
US 2015/0115118 A1 Apr. 30, 2015

(30) Foreign Application Priority Data
Oct. 25, 2013 (JP) ................................. 2013-222316

(51) Int. Cl.
*B60K 11/04* (2006.01)
*B62D 25/08* (2006.01)
*B60R 19/52* (2006.01)
*F24D 19/02* (2006.01)

(52) U.S. Cl.
CPC .............. *B60K 11/04* (2013.01); *B62D 25/084* (2013.01); *F24D 19/024* (2013.01); *B60R 2019/525* (2013.01); *F24D 19/0213* (2013.01); *F24D 19/0226* (2013.01); *F24D 19/0233* (2013.01); *F24D 19/0273* (2013.01)

(58) Field of Classification Search
CPC ....................................................... B60K 11/04
USPC .................... 180/68.4; 296/193.09, 203.02
See application file for complete search history.

(56) References Cited

U.S. PATENT DOCUMENTS

| | | | | |
|---|---|---|---|---|
| 5,123,695 | A * | 6/1992 | Kanemitsu et al. | 296/193.09 |
| 6,681,876 | B1 * | 1/2004 | Haneda et al. | 180/68.4 |
| 2002/0070062 | A1 * | 6/2002 | Joutaki et al. | 180/68.4 |
| 2002/0084122 | A1 * | 7/2002 | Emori et al. | 180/68.4 |
| 2003/0062148 | A1 * | 4/2003 | Ohki | 165/41 |
| 2004/0084236 | A1 * | 5/2004 | Okai et al. | 180/68.4 |
| 2004/0188061 | A1 * | 9/2004 | Beck et al. | 165/67 |
| 2005/0253419 | A1 * | 11/2005 | Kwon | 296/193.09 |
| 2006/0081354 | A1 * | 4/2006 | Miura et al. | 165/41 |
| 2006/0213639 | A1 * | 9/2006 | Kobayashi et al. | 165/67 |
| 2010/0038929 | A1 * | 2/2010 | Matsuzaki | 296/203.02 |

FOREIGN PATENT DOCUMENTS

| | | | |
|---|---|---|---|
| JP | 03121932 A * | 5/1991 | ............ B60K 11/04 |
| JP | A-2004-237788 | 8/2004 | |
| JP | A-2004-338668 | 12/2004 | |
| JP | A-2006-069274 | 3/2006 | |
| JP | A-2006-199250 | 8/2006 | |

* cited by examiner

*Primary Examiner* — Jonathan Liu
*Assistant Examiner* — Chiedu Chibogu
(74) *Attorney, Agent, or Firm* — Oliff PLC (57) ABSTRACT

A vehicle radiator core support, includes: a support main body including upper and lower support portions, and paired side support portions connecting right and left ends of the upper and lower support portions; and a center brace connecting intermediate parts of the upper and lower support portions. At least the lower support portion and the center brace are integrally formed. A lower-side connection portion is disposed where the lower support portion connects to the center brace, and a lower-side connection portion cross section has a U-shape opening toward a front or rear of the vehicle. A lower-side adjacent portion is disposed at a part of the lower support portion adjacent to the lower-side connection portion, such that a partition wall is between the lower-side connection and adjacent portions, and a lower-side adjacent portion cross section has a U-shape opening opposite to that of the lower-side connection portion.

6 Claims, 5 Drawing Sheets

RADIATOR CORE SUPPORT

INCORPORATION BY REFERENCE

The disclosure of Japanese Patent Application No. 2013-222316 filed on Oct. 25, 2013 including the specification, drawings and abstract is incorporated herein by reference in its entirety.

BACKGROUND OF THE INVENTION

1. Field of the Invention

The present invention relates to a radiator core support for a vehicle, and more particularly, to improvement of a radiator core support that includes a center brace.

2. Description of Related Art

There has been known a radiator core support for a vehicle including (a) a support main body including an upper support portion and a lower support portion that are substantially horizontal and parallel to each other, and paired side support portions that are substantially vertical and parallel to each other, and that connect right ends of the upper support portion and the lower support portion to each other, and connect left ends of the upper support portion and the lower support portion to each other, the entire support main body having a rectangular frame shape, and (b) a center brace that connects intermediate parts of the upper support portion and the lower support portion to each other. A device described in Japanese Patent Application Publication No. 2004-338668 (JP 2004-338668 A) is an example of the radiator core support. In this device, a fan motor stay functions as the center brace (reinforcing member).

PRIOR ART DOCUMENTS

Patent Documents

Patent Document 1: Japanese Laid-Open Patent Publication No. 2004-338668

SUMMARY OF THE INVENTION

Problem to be Solved by the Invention

Although not known yet, it is conceivable to form a part of the radiator core support or the entire radiator core support by using a synthetic resin material. In this case, when the lower support portion is formed to have a U-shaped cross section so that the weight of the radiator core support is reduced, necessary strength cannot be ensured at a connection part where the lower support portion is connected to the center brace. As a result, there is a possibility that breakage may occur.

The present invention has been made in view of the above-described circumstances, and an object of the present invention is to reduce the weight while ensuring the strength of a connection part in a case where at least a lower support portion and a center brace are formed as an integrated body by using a synthetic resin material.

Means for Solving the Problem

To achieve the object, the first aspect of the invention provides a radiator core support for a vehicle, comprising: (a) a support main body including an upper support portion and a lower support portion that are substantially horizontal and parallel to each other, and paired side support portions that are substantially vertical and parallel to each other and that connect right ends of the upper support portion and the lower support portion to each other, and connect left ends of the upper support portion and the lower support portion to each other, the entire support main body having a rectangular frame shape; and (b) a center brace that connects intermediate parts of the upper support portion and the lower support portion to each other, (c) wherein at least the lower support portion and the center brace are formed as an integrated body by using a synthetic resin material, (d) wherein a lower-side connection portion is disposed at a part at which the lower support portion is connected to the center brace, and a cross section of the lower-side connection portion in an up-down direction has a substantially U-shape that is open toward a front of a vehicle or a rear of the vehicle, and (e) wherein a lower-side adjacent portion is disposed at a part of the lower support portion, which is adjacent to the lower-side connection portion, in a manner such that a partition wall is disposed between the lower-side connection portion and the lower-side adjacent portion, and a cross section of the lower-side adjacent portion in the up-down direction has a substantially U-shape that is open in a direction opposite to a direction in which the cross section of the lower-side connection portion is open.

The second aspect of the invention provides the radiator core support recited in the first aspect of the invention, wherein (a) the cross section of the lower-side connection portion in the up-down direction has the substantially U-shape that is open toward the front of the vehicle, wherein (b) the cross section of the lower-side adjacent portion in the up-down direction has the substantially U-shape that is open toward the rear of the vehicle, and the lower-side adjacent portion is disposed at each of two locations adjacent to respective sides of the lower-side connection portion in a manner such that the partition wall is disposed between the lower-side connection portion and each of the lower-side adjacent portions.

The third aspect of the invention provides the radiator core support recited in the first or second aspect of the invention, wherein (a) a brace-side connection portion is disposed at a part at which the center brace is connected to the lower support portion, and a cross section of the brace-side connection portion in a vehicle width direction has a substantially U-shape that is open toward the front of the vehicle, and wherein (b) a brace-side adjacent portion is disposed at a part of the center brace, which is adjacent to the brace-side connection portion, in a manner such that a partition wall is disposed between the brace-side connection portion and the brace-side adjacent portion, and a cross section of the brace-side adjacent portion has a substantially U-shape that is open toward the rear of the vehicle, the cross section of the brace-side adjacent portion being perpendicular to a longitudinal direction of the center brace.

The fourth aspect of the invention provides the radiator core support recited in the third aspect of the invention, wherein (a) the brace-side connection portion is connected to a front side part of the lower-side connection portion, and wherein (b) a reinforcing rib is disposed so as to be connected to a rear wall of the brace-side connection portion and an upper wall of the lower-side connection portion.

The fifth aspect of the invention provides the radiator core support recited in any one of the first to fourth aspects of the invention, wherein in each of the lower-side connection portion and the lower-side adjacent portion, at least one of an upper wall and a lower wall is inclined such that a width dimension increases toward an opening side in the cross section having the U-shape.

The sixth aspect of the invention provides the radiator core support recited in any one of the first to fifth aspects of the invention, wherein (a) the center brace has an inverted Y shape, and a brace-side connection portion is disposed at each of distal end portions of a bifurcated-shaped portion of the center brace, and wherein (b) in the lower support portion, the lower-side connection portion is disposed at each of two locations that are apart, by a same dimension, from the respective side support portions on right and left sides, and the brace-side connection portion is connected to each of the lower-side connection portions at the two locations.

The "substantially U-shape" in above-described inventions may include a shape having a portion bent into a curved shape, or having corner portions. Further, the corner portions can be rounded off or become angular. The "substantially U-shape" includes a shape in which a depth dimension is relatively larger with respect to a dimension (e.g. a diameter) at the opening, such as a dish-like shape. Paired side walls forming the U-shape may be made wider as they extend toward the opening side, or they can be parallel.

Effects of the Invention

In the radiator core support as described above, although the lower support portion and the center brace are formed as an integrated body by using a synthetic resin material, a lower-side connection portion is disposed at a part at which the lower support portion is connected to the center brace, the lower-side connection portion has a U-shaped cross section that is open toward a front of a vehicle or a rear of the vehicle, while a lower-side adjacent portion is disposed at a part, which is adjacent to the lower-side connection portion, the lower-side adjacent portion has a U-shaped cross section that is open in a direction opposite to a direction in which the cross section of the lower-side connection portion is open. Furthermore, the partition wall is disposed between the lower-side connection portion and the lower-side adjacent portion. Therefore, the rigidity of the connection parts can be increased, and the weight can be reduced by using the U-shaped cross sections while necessary strength can be ensured.

In the second aspect of the invention, the lower-side adjacent portions which are open in the direction opposite to the direction in which the lower-side connection portions are open, are disposed at the two locations adjacent to the respective sides of each lower-side connection portion in a manner such that the partition walls are disposed between the lower-side connection portion and the lower-side adjacent portion. Therefore, the rigidity of the connection parts can be improved in a balanced manner, while the weight can be reduced.

In the third aspect of the invention, the brace-side connection portions, each of which has the U-shaped cross section that is open toward the front of the vehicle, are disposed at the parts at which the center brace is connected to the lower support portion, the brace-side adjacent portion, which has the U-shaped cross section that is open toward the rear of the vehicle, is disposed at the part adjacent to each brace-side connection portion, and the partition wall is disposed between the brace-side connection portion and the brace-side adjacent portion. Accordingly, the rigidity of the connection parts on a center brace-side can be increased, and the weight can be further reduced by using the U-shaped cross sections of the brace-side connection portions and the brace-side adjacent portions, while the necessary strength is ensured.

In the fourth aspect of the invention, each of the reinforcing ribs is disposed so as to be connected to the rear wall of the corresponding brace-side connection portion and the upper wall of the corresponding lower-side connection portion, and thus the rigidity of the connection parts is further increased. Accordingly, for example, even when the upper support portion and the lower support portion are offset in the vehicle front-rear direction and a moment is caused, product destruction caused by a moment load is suppressed since the rigidity of the connection parts is increased by the reinforcing ribs.

In the fifth aspect of the invention, since in each of the lower-side connection portion and the lower-side adjacent portion, at least one of an upper wall and a lower wall is inclined such that a width dimension increases toward an opening side in the cross section having the U-shape, a mold is easily removed during the resin molding although the U-shaped cross sections alternately open in opposite directions.

The sixth aspect of the invention is a case that the center brace has an inverted Y shape, and in the lower support portion, the lower-side connection portion is disposed at each of two locations that are apart, by a same dimension, from the respective side support portions on right and left sides, and the center brace is connected to each of the lower-side connection portions at the two locations. Accordingly, the strength of the lower support portion is improved in a balanced manner, over the entire length in the vehicle width direction.

MODE FOR CARRYING OUT THE INVENTION

The radiator core support according to the present invention mainly supports a radiator main body that cools a cooling fluid for engine cooling or the like. However, the radiator core support may support another cooling component such as an air-conditioning condenser of an air-conditioning apparatus. Also, the radiator core support may be configured to support a plurality of types of cooling components such as the radiator main body and the air-conditioning condenser.

In the radiator core support, at least the lower support portion and the center brace are formed as an integrated body by using a synthetic resin material, but all of the support main body and the center brace may be formed as an integrated body by using the synthetic resin material. Also, various other forms may be employed. For example, the lower support portion and paired side support portions in the support main body may be formed integrally with the center brace so as to be an integrated body by using the synthetic resin material, and the integrated body may be fixed to a supporting frame or the like disposed in a vehicle body so that the entire radiator core support is formed. A polypropylene resin, a polyamide resin, or the like is suitably used as the synthetic resin material.

Figure 9:
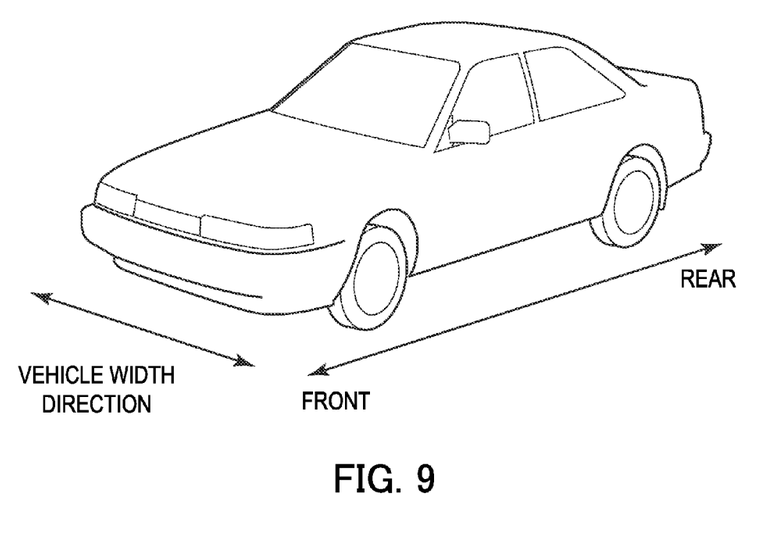
FIG. 9 is a perspective view of the vehicle showing the front of the vehicle, the rear of the vehicle, and the vehicle width direction.

The lower-side connection portion in the lower support portion has the U-shaped cross section that is open toward the front of the vehicle or the rear of the vehicle, the front of the vehicle and the rear of the vehicle being shown in FIG. 9. The lower-side adjacent portion, which has the U-shaped cross section that is open in the opposite direction, is disposed adjacent to the lower-side connection portion. The lower-side adjacent portion may be disposed to continuously extend to an end portion of the lower support portion. In this case, a partition plate such as a rib may be disposed with an appropriate clearance being provided between the partition plate and the end portion of the lower support portion, if necessary. Alternatively, partition plates such as ribs may be disposed at appropriate intervals if necessary. Also, various other forms may be employed. For example, front open portions and rear open portions may be alternately disposed at predetermined positions in a manner such that a partition wall is disposed between each front open portion and the rear open portion adjacent to the front open portion. Each front open portion has a U-shaped cross section that is open toward the front of the vehicle, and each rear open portion has a U-shaped cross section that is open toward the rear of the vehicle, as is the case with the lower-side connection portion or the lower-side adjacent portion. It is appropriate to employ, for example, a lower support portion that has a small dimension in a vehicle up-down direction and a relatively large dimension in a vehicle front-rear direction. In this case, the lower support portion has a deep hole shape and has a U-shaped cross section in which a dimension to a bottom is relatively large.

It is preferable that the lower-side adjacent portion, which is open in the direction opposite to the direction in which the lower-side connection portion is open, be disposed at each of two locations that are adjacent to respective sides of the lower-side connection portion in a manner such that a partition wall is disposed between the lower-side connection portion and the lower-side adjacent portion. However, the lower-side adjacent portion may be disposed at only one location that is adjacent to one side of the lower-side connection portion, and a solid plate-shaped portion or the like, or a portion that has a U-shaped cross section that opens in the same direction as the direction in which the lower-side connection portion is open may be disposed on the other side of the lower-side connection portion. According to the second invention, the lower-side connection portion is the front open portion that is open toward the front of the vehicle and the lower-side adjacent portion is the rear open portion that is open toward the rear of the vehicle. However, when the first invention is implemented, the lower-side connection portion may be the rear open portion that is open toward the rear of the vehicle and the lower-side adjacent portion may be the front open portion that is open toward the front of the vehicle.

In the third invention, the brace-side connection portion, which has the U-shaped cross section that is open toward the front of the vehicle, is disposed in the center brace, and the brace-side adjacent portion, which has the U-shaped cross section that is open toward the rear of the vehicle, is disposed adjacent to the brace-side connection portion. However, when other inventions are implemented, various other forms may be implemented. For example, a center brace, which has a U-shaped cross section opening toward the front of the vehicle or the rear of the vehicle over an entire length, may be used, or a solid center brace with a quadrangular cross section or a plate-shape solid center brace may be used. In the center brace as well, the brace-side adjacent portion may be disposed to continuously extend to the other end portion of the center brace, and it is preferable that at least one partition plate such as a rib be disposed if necessary. However, various other forms may be employed. For example, front open portions and rear open portions may be alternately disposed at predetermined positions in a manner such that a partition wall is disposed between each front open portion and the rear open portion adjacent to the front open portion. Each front open portion has a U-shaped cross section that is open toward the front of the vehicle, and each rear open portion has a U-shaped cross section that is open toward the rear of the vehicle. It is appropriate to employ, for example, a center brace that has a small dimension in the vehicle front-rear direction and a relatively large dimension in the vehicle width direction, the vehicle width direction being shown in FIG. 9. In this case, the center brace has a shallow dish shape and has a U-shaped cross section in which a dimension to a bottom is relatively small.

In the fourth invention, the brace-side connection portion is connected to the front side part of the lower-side connection portion, and the reinforcing rib is disposed so as to be connected to the rear wall of the brace-side connection portion and the upper wall of the lower-side connection portion. However, the reinforcing rib may be disposed only when necessary. In addition, in a case where the brace-side connection portion is solid or in a case where the brace-side connection portion has a U-shaped cross section that is open toward the rear of the vehicle, the brace-side connection portion may be connected to a rear side part of the lower-side connection portion and the reinforcing rib may be disposed so as to be connected to a front wall of the brace-side connection portion and the upper wall of the lower-side connection portion.

In the sixth invention, the inverted Y-shaped center brace is used. However, a center brace having an X shape, an I shape, or an H shape may be employed, and it is preferable that the center brace be disposed so as to be bilaterally symmetric about a center position of the support main body in the vehicle width direction. In addition, various other forms may be employed. For example, a plurality of the I-shaped center braces may be disposed so as to be apart from each other in the vehicle width direction.

DETAILED DESCRIPTION OF EMBODIMENTS

Figure 1:
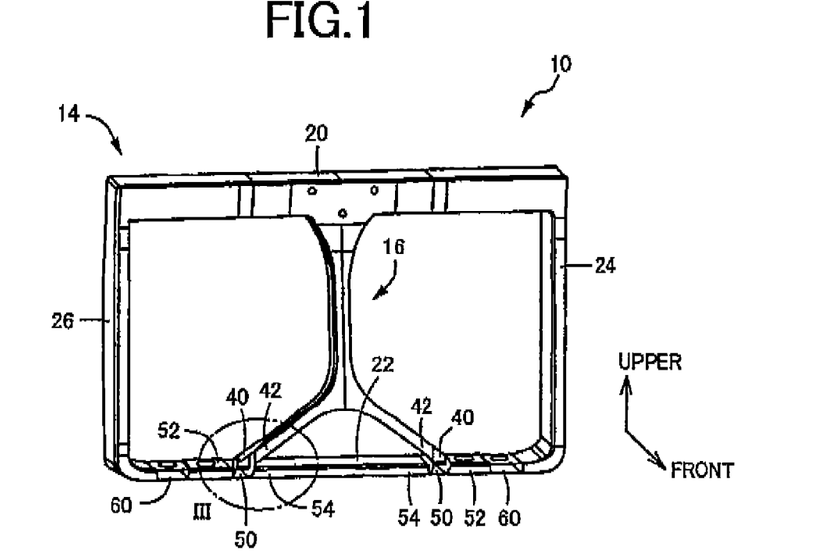
FIG. 1 is an explanatory view of a radiator core support according to the embodiment of the present invention, the view being a perspective view showing the radiator core support seen from the vehicle front side.
Figure 2:
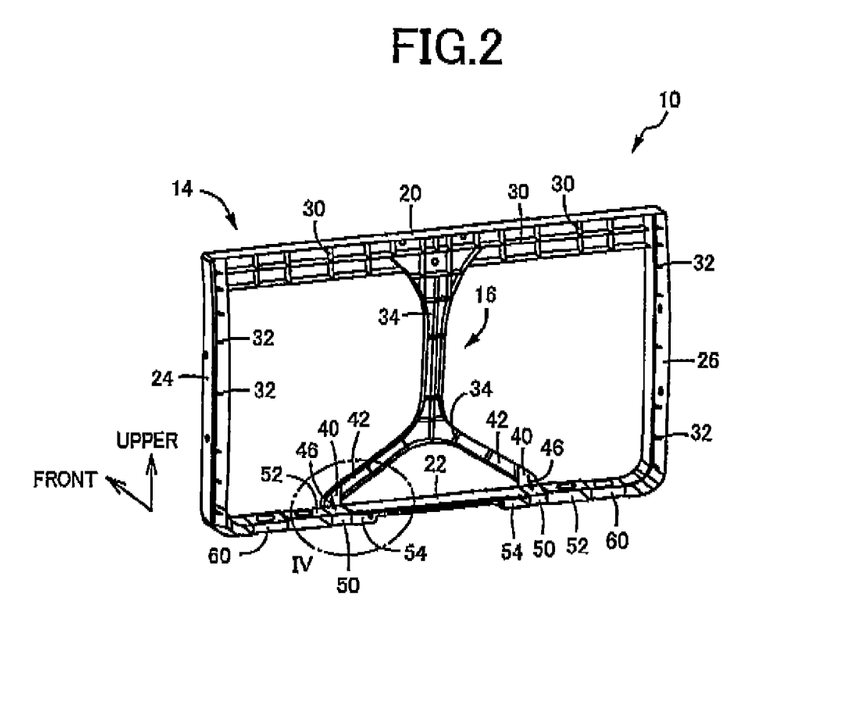
FIG. 2 is a perspective view showing the radiator core support of FIG. 1 seen from a vehicle rear side.
Figure 3:
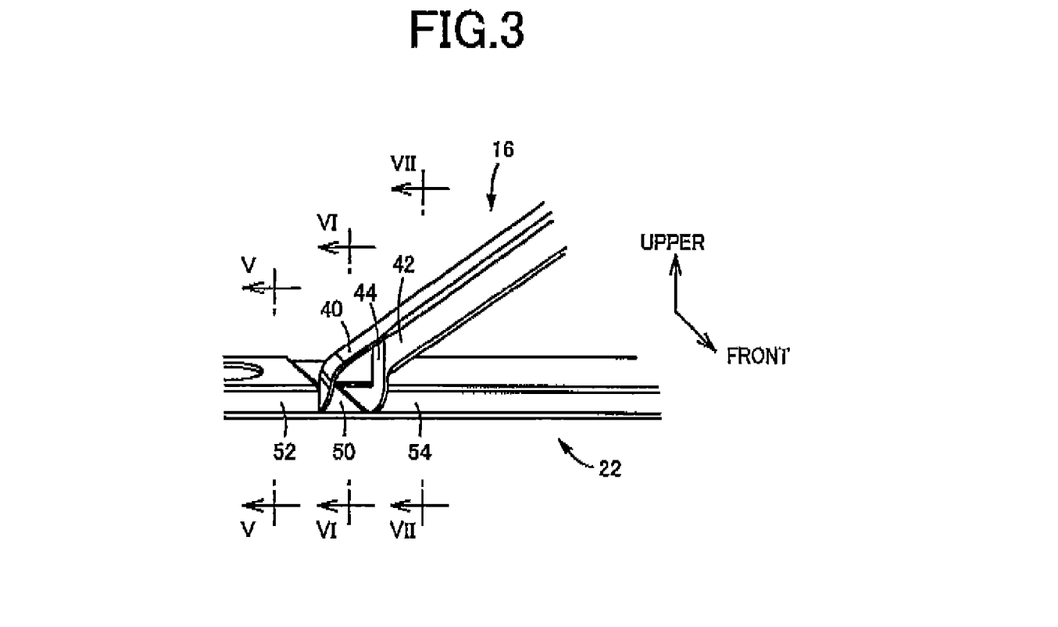
FIG. 3 is a perspective view showing an enlarged III part in FIG. 1.
Figure 4:
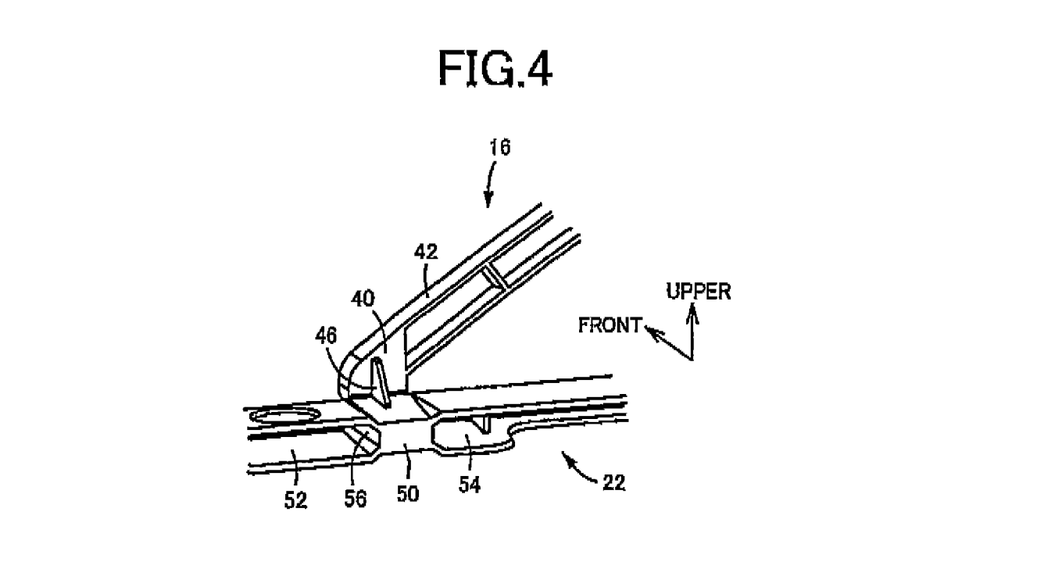
FIG. 4 is a perspective view showing an enlarged IV part in FIG. 2.
Figure 5:
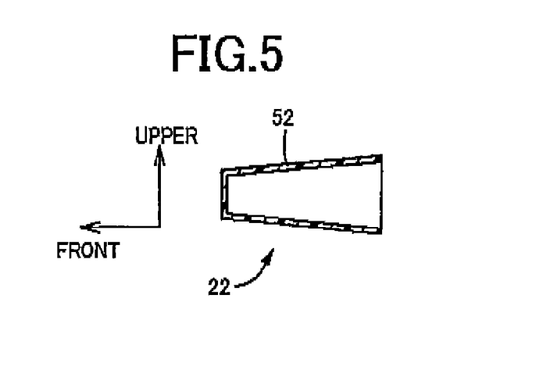
FIG. 5 is a sectional view showing a part taken along a line V-V and seen in a direction indicated by arrows in FIG. 3.
Figure 6:
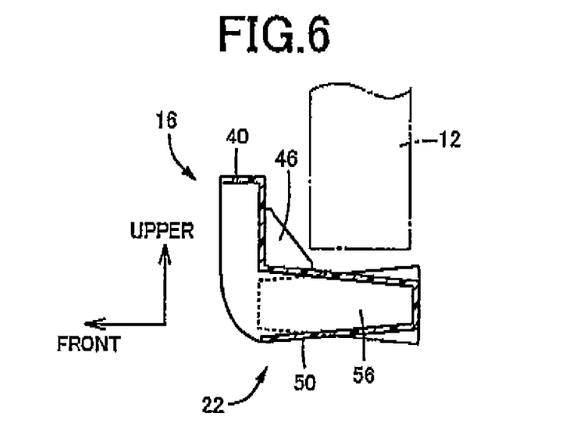
FIG. 6 is a sectional view showing a part taken along a line VI-VI and seen in a direction indicated by arrows in FIG. 3.
Figure 7:
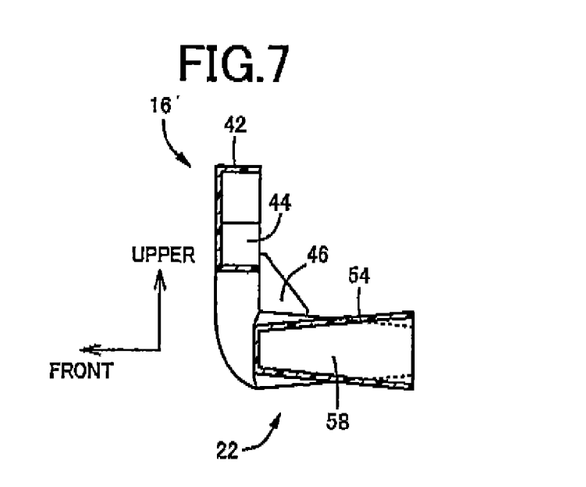
FIG. 7 is a sectional view showing a part taken along a line VII-VII and seen in a direction indicated by arrows in FIG. 3.

Hereinafter, an embodiment of the present invention will be described in detail with reference to the accompanying drawings. FIG. 1 is an explanatory view of a radiator core support 10 according to the embodiment of the present invention, the view being a perspective view showing the radiator core support 10 seen from the vehicle front side. FIG. 2 is a perspective view showing the radiator core support 10 seen from a vehicle rear side. FIG. 3 is a perspective view showing an enlarged III part in FIG. 1. FIG. 4 is a perspective view showing an enlarged IV part in FIG. 2. In addition, FIGS. 5 to 7 are sectional views showing a part taken along a line V-V and seen in a direction indicated by arrows, a part taken along a line VI-VI and seen in a direction indicated by arrows, and a part taken along a line VII-VII and seen in a direction indicated by arrows in FIG. 3, respectively. The radiator core support 10 is disposed in substantially parallel with a vehicle width direction behind a front grille at a vehicle front side so as to have a substantially vertical posture. The radiator core support 10 supports a radiator main body 12 (refer to FIG. 6)

that cools a cooling fluid for engine cooling. The radiator core support 10 includes a support main body 14 and a center brace 16. The support main body 14 and the center brace 16 are formed as an integrated body by using a synthetic resin material.

The support main body 14 integrally includes an upper support portion 20, a lower support portion 22, and paired side support portions 24 and 26. The upper support portion 20 and the lower support portion 22 are substantially horizontal and parallel to each other, and the side support portions 24 and 26 are substantially vertical and parallel to each other, and connect right ends of the upper support portion 20 and the lower support portion 22 to each other, and connect left ends of the upper support portion 20 and the lower support portion 22 to each other. The entire support main body 14 has a rectangular frame shape. The center brace 16 has an inverted Y shape, and is disposed so as to be bilaterally symmetric about a center position of the support main body 14 in the vehicle width direction. In other words, a distal end portion of an upper end side portion with an I shape is integrally connected to a central part of the upper support portion 20 in the vehicle width direction, and distal end portions of a lower end side portion with a bifurcated shape are integrally connected to symmetrical positions across a center line of the lower support portion 22 in the vehicle width direction, that is, two locations that are apart, by the same dimension, from the respective side support portions 24 and 26 on both right and left sides. FIGS. 3 and 4 are perspective views showing connection parts on the opposite sides in right-left directions, which are seen from the vehicle front side and the vehicle rear side, respectively. The connection parts are configured in a bilaterally symmetric manner, and have substantially the same structure.

A cross section of the upper support portion 20 in an up-down direction perpendicular to a longitudinal direction thereof, that is, perpendicular to the vehicle width direction has a substantially U-shape that is open toward the rear of the vehicle. A plurality of reinforcing ribs 30 are disposed in a lattice shape in an opening of the upper support portion 20 to be perpendicular to or parallel to the longitudinal direction. A cross section of each of the side support portions 24 and 26 in a horizontal direction perpendicular to a longitudinal direction thereof, that is, perpendicular to the vehicle up-down direction has a substantially U-shape that is open toward the rear of the vehicle. A plurality of reinforcing ribs 32 are disposed in an opening of each of the side support portions 24 and 26 to be perpendicular to the longitudinal direction. A cross section of each of portions of the inverted Y-shaped center brace 16 has a substantially U-shape that is open toward the rear of the vehicle, the cross section being perpendicular to a longitudinal direction thereof. A plurality of reinforcing ribs 34 are disposed in an opening of the center brace 16 to be perpendicular to or parallel to the longitudinal direction. The reinforcing ribs 30 and 34 are continuously disposed so as to be connected to the upper support portion 20 and the center brace 16, at a connection part where the upper support portion 20 is connected to the center brace 16.

Each of brace-side connection portions 40 at two locations has a substantially U-shaped cross section that is open toward the front of the vehicle, that is, open in the opposite direction. The center brace 16 is connected to the lower support portion 22 at the brace-side connection portions 40, and the brace-side connection portions 40 are located at the distal end portions of the bifurcated-shaped portion of the center brace 16. A portion that is adjacent to each brace-side connection portion 40, that is, a brace-side adjacent portion 42 has a substantially U-shaped cross section that is open toward the rear of the vehicle. A partition wall 44 is disposed between the brace-side connection portion 40 and the brace-side adjacent portion 42. In the center brace 16, a portion in the vicinity of the brace-side connection portion 40 and the brace-side adjacent portion 42 has a small dimension in a vehicle front-rear direction, and a relatively large dimension in the vehicle width direction (direction perpendicular to the longitudinal direction). The portion in the vicinity of the brace-side connection portion 40 and the brace-side adjacent portion 42 has a shallow dish shape and has a U-shaped cross section in which a dimension to a bottom is relatively small. The brace-side connection portions 40 are connected to a front end part of the lower support portion 22, and the radiator main body 12 is disposed behind the brace-side connection portions 40. Each of reinforcing ribs 46 is disposed so as to be connected to a rear wall of the corresponding brace-side connection portion 40 and an upper wall of the lower support portion 22.

A cross section of the lower support portion 22 in the up-down direction perpendicular to a longitudinal direction thereof, that is, the vehicle width direction has a substantially U-shape that is open toward the front of the vehicle or the rear of the vehicle. Each of two lower-side connection portions 50 connected to the center brace 16 has a substantially U-shaped cross section that is open toward the front of the vehicle. Each of portions adjacent to respective sides of each lower-side connection portion 50, that is, each of paired lower-side adjacent portions 52 and 54 has a substantially U-shaped cross section that is open toward the rear of the vehicle, that is, open in the opposite direction. Partition walls 56 and 58 are disposed respectively between the lower-side connection portion 50 and the lower-side adjacent portion 52 and between the lower-side connection portion 50 and the lower-side adjacent portion 54. The partition wall 58 is integrally connected to the partition wall 44. In addition, in this embodiment, a front open portion 60 with a U-shaped cross section, which is open toward the front of the vehicle as is the case with the lower-side connection portion 50, is further disposed at a part adjacent to the lower-side adjacent portion 52 on an outer side in a manner such that a partition wall is disposed between the front open portion 60 and the lower-side adjacent portion 52. Each of the reinforcing ribs 46 is disposed so as to be connected to an upper wall of the corresponding lower-side connection portion 50 and the rear wall of the corresponding brace-side connection portion 40.

The lower support portion 22 has a small dimension in the vehicle up-down direction, and a relatively large dimension in the vehicle front-rear direction. The lower support portion 22 has a deep hole shape and has a U-shaped cross section in which a dimension to a bottom is relatively large. The radiator main body 12 can be disposed on the upper wall of the lower support portion 22. In addition, in the lower support portion 22 including the lower-side connection portions 50 and the lower-side adjacent portions 52 and 54, the upper wall and a lower wall are inclined in the up-down direction, substantially symmetrically, in a manner such that a width dimension increases toward an opening side in the U-shaped cross section, and a draft angle is ensured during resin molding. Similarly, in the side support portions 24 and 26 each of which has a deep hole shape and has a U-shaped cross section in which the dimension to the bottom is relatively large, a draft angle is provided in a manner such that the width dimension increases toward the opening side.

In the radiator core support 10 according to this embodiment, the support main body 14 including the lower support portion 22, and the center brace 16 are formed as an integrated body by using the synthetic resin material. The lower-side connection portions 50, each of which has the U-shaped cross section that is open toward the front of the vehicle, are disposed at the parts at which the lower support portion 22 is connected to the center brace 16, the lower-side adjacent portions 52 and 54, each of which has the U-shaped cross section that is open toward the rear of the vehicle, are disposed at the parts adjacent to the respective sides of each lower-side connection portion 50, and the partition walls 56 and 58 are disposed between the lower-side connection portion 50 and the lower-side adjacent portion 52, and between the lower-side connection portion 50 and the lower-side adjacent portion 54. Therefore, the rigidity of the connection parts can be increased, and the weight can be reduced by using the U-shaped cross sections while necessary strength can be ensured.

In particular, the lower-side adjacent portions 52 and 54, which are open in the direction opposite to the direction in which the lower-side connection portions 50 are open, are disposed at the two locations adjacent to the respective sides of each lower-side connection portion 50 in a manner such that the partition walls 56 and 58 are disposed between the lower-side connection portion 50 and the lower-side adjacent portion 52, and between the lower-side connection portion 50 and the lower-side adjacent portion 54. Therefore, the rigidity of the connection parts can be improved in a balanced manner, while the weight can be reduced.

In addition, the brace-side connection portions 40, each of which has the U-shaped cross section that is open toward the front of the vehicle, are disposed at the parts at which the center brace 16 is connected to the lower support portion 22, the brace-side adjacent portion 42, which has the U-shaped cross section that is open toward the rear of the vehicle, is disposed at the part adjacent to each brace-side connection portion 40, and the partition wall 44 is disposed between the brace-side connection portion 40 and the brace-side adjacent portion 42. Accordingly, the rigidity of the connection parts on a center brace 16-side can be increased, and the weight can be further reduced by using the U-shaped cross sections of the brace-side connection portions 40 and the brace-side adjacent portions 42, while the necessary strength is ensured.

Figure 8:
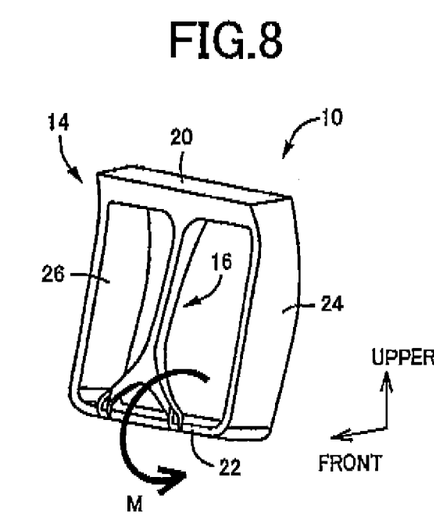
FIG. 8 is a diagram for explaining a moment M generated in the radiator core support of FIG. 1.

In addition, each of the reinforcing ribs 46 is disposed so as to be connected to the rear wall of the corresponding brace-side connection portion 40 and the upper wall of the corresponding lower-side connection portion 50, and thus the rigidity of the connection parts is further increased. In this embodiment, the lower support portion 22 is offset toward the vehicle front side from the upper support portion 20 as shown in FIG. 8, and a moment M is caused in the lower support portion 22. However, product destruction caused by a moment load is suppressed since the rigidity is increased by the reinforcing ribs 46.

In addition, in the lower support portion 22 including the lower-side connection portions 50 and the lower-side adjacent portions 52 and 54, the upper wall and the lower wall are respectively inclined in the up-down direction in a manner such that the width dimension increases toward the opening side in the U-shaped cross section. Accordingly, a mold is easily removed during the resin molding although the U-shaped cross sections alternately open in opposite directions.

In addition, the inverted Y-shaped center brace 16 is disposed so as to be bilaterally symmetric about the center position of the support main body 14 in the vehicle width direction, and the brace-side connection portions 40 at the two locations at the distal end portions of the bifurcated-shaped portion are respectively connected to the lower-side connection portions 50 at the two locations that are apart, by the same dimension, from the respective side support portions 24 and 26. Accordingly, the strength of the lower support portion 22 is improved in a balanced manner, over the entire length in the vehicle width direction.

The embodiment of the present invention has been described above in detail with reference to the accompanying drawings. However, the above embodiment is one example embodiment, and the present invention may be implemented in forms obtained by making various modifications and improvements to the above embodiment based on knowledge of those skilled in the art.

NOMENCLATURE OF ELEMENTS

10: radiator core support 14: support main body 16: center brace 20: upper support portion 22: lower support portion 24, 26: side support portion 40: brace-side connection portion 42: brace-side adjacent portion 44: partition 50: lower-side connection portion 52, 54: lower-side adjacent portion 56, 58: partition wall

What is claimed is:

1. A radiator core support for a vehicle, the radiator core support comprising:
   a support main body, the support main body including:
      an upper support portion;
      a lower support portion, the upper support portion and the lower support portion being substantially horizontal and parallel to each other; and
      a pair of side support portions that are substantially vertical and parallel to each other, one of the side support portions connecting a right end of the upper support portion and a right end of the lower support portion to each other, and another of the side support portions connecting a left end of the upper support portion and a left end of the lower support portion to each other, the support main body as a whole having a rectangular frame shape; and
   a center brace that connects an intermediate part of the upper support portion and an intermediate part of the lower support portion to each other, wherein
      at least the lower support portion and the center brace are formed as an integrated body by using a synthetic resin material,
      a lower-side connection portion formed as part of the lower support portion, the lower-side connection portion is disposed at a part at which the lower support portion is connected to the center brace, and a cross section of the lower-side connection portion in an up-down direction has a substantially U-shape that is open toward a front of a vehicle or a rear of the vehicle, and
      lower-side adjacent portions are disposed in the lower support portion on opposite sides of the lower-side connection portion, the lower-side adjacent portions being adjacent to respective sides of the lower-side connection portion, in a manner such that a partition wall is disposed between the lower-side connection portion and each of the lower-side adjacent portions, and a cross section of each of the lower-side adjacent portions in the up-down direction has a substantially U-shape that is open in a direction opposite to a direction in which the cross section of the lower-side connection portion is open.

2. The radiator core support according to claim 1, wherein the cross section of the lower-side connection portion in the up-down direction has the substantially U-shape that is open toward the front of the vehicle; and the cross section of each of the lower-side adjacent portions in the up-down direction has the substantially U-shape that is open toward the rear of the vehicle.

3. The radiator core support according to claim 1, wherein
a brace-side connection portion is disposed at a part at which the center brace is connected to the lower support portion, and a cross section of the brace-side connection portion in a vehicle width direction has a substantially U-shape that is open toward the front of the vehicle; and
a brace-side adjacent portion is disposed at a part of the center brace, which is adjacent to the brace-side connection portion, in a manner such that a partition wall is disposed between the brace-side connection portion and the brace-side adjacent portion, and a cross section of the brace-side adjacent portion has a substantially U-shape that is open toward the rear of the vehicle, the cross section of the brace-side adjacent portion being perpendicular to a longitudinal direction of the center brace.

4. The radiator core support according to claim 3, wherein
brace-side connection portion is connected to a front side part of the lower-side connection portion; and
a reinforcing rib is disposed so as to be connected to a rear wall of the brace-side connection portion and an upper wall of the lower-side connection portion.

5. The radiator core support according to claim 1,
wherein in each of the lower-side connection portion and the lower-side adjacent portions, at least one of an upper wall and a lower wall is inclined such that a width dimension increases toward an opening side in the cross section having the U-shape.

6. The radiator core support according to claim 1, wherein
the center brace has an inverted Y shape, and a brace-side connection portion is disposed at each of distal end portions of a bifurcated-shaped portion of the center brace, and
in the lower support portion, the lower-side connection portion is disposed at each of two locations that are apart, by a same dimension, from each of the right end and the left end of the lower support portion, and the brace-side connection portion is connected to the lower-side connection portion at each of the two locations.

* * * * *